United States Patent [19]
Hallidy

[11] Patent Number: 5,929,582
[45] Date of Patent: Jul. 27, 1999

[54] DIRECT CURRENT ELECTRICAL MOTOR SYSTEM AND METHOD OF USING SAME

[76] Inventor: William M. Hallidy, 620 E. Laurel, Glendora, Calif. 91740

[21] Appl. No.: 08/944,619

[22] Filed: Oct. 2, 1997

[51] Int. Cl.⁶ .............................. H02P 5/178; H02P 7/36
[52] U.S. Cl. ........................ 318/494; 318/493; 318/434; 388/803; 388/806
[58] Field of Search ................................ 318/138, 139, 318/245, 254, 430–454

[56] References Cited

U.S. PATENT DOCUMENTS

| | | | |
|---|---|---|---|
| 3,584,229 | 6/1971 | West et al. | 318/250 |
| 3,996,504 | 12/1976 | Grzebielski | 318/258 |
| 4,374,347 | 2/1983 | Muller | 318/138 |
| 4,525,669 | 6/1985 | Holberton et al. | 324/142 |
| 4,649,340 | 3/1987 | Zabler | 324/207 |
| 4,952,853 | 8/1990 | Archer | 318/254 |
| 5,151,638 | 9/1992 | Beckerman | 318/434 |
| 5,483,615 | 1/1996 | Hallidy | 388/803 |
| 5,528,210 | 6/1996 | Huang et al. | 335/216 |

*Primary Examiner*—Paul Ip
*Attorney, Agent, or Firm*—Higgs, Fletcher & MackLLP; Bernard L. Kleinke

[57] ABSTRACT

The DC electrical motor system includes a motor having an armature DC transducer coupled to an armature current controller by a sensor/detector arrangement to control the armature current. A field DC transducer coupled to a field current controller by another sensor/detector arrangement facilitates the control of the field current. An armature-field comparator is coupled to the field current controller to help control the field current when the motor armature windings are short-circuited through windings in the armature field comparator.

41 Claims, 1 Drawing Sheet

FIG. 1

DIRECT CURRENT ELECTRICAL MOTOR SYSTEM AND METHOD OF USING SAME

TECHNICAL FIELD

This invention relates to direct current electrical motor systems. More particularly, the invention relates to an improved direct current electrical motor system for controlling the rotational speed of the motor.

BACKGROUND ART

The use of direct current (DC) electrical motor systems in vehicles is well known. For example, motor vehicles such as golf carts and personal mobility carts, having separate brake and throttle controls, utilized DC electrical motor systems with success. The relatively quiet operation of the DC electrical motor systems combined with their ease of use make them ideal for utilization in the motor vehicles.

Although the DC electrical motor systems have provided good overall performance in such motor vehicles, there have been difficulties in controlling the DC electrical motor systems in emergency situations. A particularly serious difficulty has arisen when the motor vehicle encountered a steep downhill slope.

In such an emergency situation, the operator was required to release the throttle control and activate the brake control. Unfortunately, the throttle and brake controls were susceptible to being mistaken for one another. As a result, a nervous operator was able to activate the throttle control and not the brake control under the emergency conditions, causing the motor vehicle to increase its downward momentum.

Even where the operator was able to distinguish between the throttle and brake controls, the operator had to have the presence of mind to deactivate the throttle control and activate the brake control. Where the throttle control and brake control were foot pedals, the operator had to be able to reach the brake pedal when the emergency arose. As the operator could be forced backward as the motor vehicle hurtled downhill, reaching the brake pedal was made difficult. As a result, the safety of the motor vehicle operator was at risk.

A DC electrical motor system for safely controlling motor performance of a motor vehicle was disclosed in U.S. Pat. No. 5,483,615. The DC electrical motor system included a DC motor having an armature winding and a field winding, wherein the armature current was electromagnetically coupled to the field winding current to facilitate controlling the magnitude of the field winding current relative to the magnitude of the armature current. By controlling the field winding current magnitude, the maximum rotational speed at which the DC motor developed motoring torque, i.e., the maximum motoring speed, could be controlled. Any increase in speed above the maximum motoring speed caused the DC motor to act as a generator, whereby an increase in rotational speed above the maximum motoring speed was resisted.

The disclosed DC electrical motor system further included a rotational speed control for determining the maximum rotational speed of the DC motor before it acted as a generator to develop a retarding torque. The rotational speed control enabled the motor vehicle operator to select one of a plurality of discrete settings corresponding to a similar number of maximum motoring speed settings. In this way, the operator was able to select a maximum motoring speed for the DC motor.

In one disclosed embodiment, the discrete settings were selected by a hand operated selector switch. In another embodiment, the discrete settings were selected according to the position of the brake control.

While the disclosed DC electrical motor system very satisfactorily enabled the operator to select the maximum motoring speed for the DC motor, the ability to select the maximum motoring speed by the vehicle operator was impaired during an emergency. In an emergency situation, the operator was subjected to a great deal of stress which affected the operator's decision making abilities. Selecting the appropriate maximum motoring speed during such an emergency required the operator to determine what selection was best suited for the situation, and to activate either the hand operated selector switch or the brake control, all in a very short period of time. As a result, the selection of the appropriate maximum motoring speed was difficult, especially for an inexperienced operator.

Therefore, it would be highly desirable to have a new and improved DC electrical motor system which provides a relatively fail safe way for controlling the maximum motoring speed of a motor vehicle.

During the operation of a motor vehicle, prior known DC electrical motor systems utilized the energy stored in battery cells, thereby decreasing the voltage stored by the battery cells. A continuing demand of current by the DC electrical motor systems while the voltage stored by the battery cells decreased had the potential for causing damage to the battery cells.

Therefore, it would also be highly desirable to have a new and improved DC electrical motor system that reduces the risk of damage to battery cells. Such a DC electrical motor system should be simplified in design and relatively inexpensive to manufacture.

DISCLOSURE OF THE INVENTION

Therefore, the principal object of the present invention is to provide a new and improved DC electrical motor system that enables the maximum motoring speed of the DC motor to be controlled in a relatively fail safe manner.

Another object of the present invention is to provide a new and improved DC electrical motor system that minimizes battery cell damage, is simplified in design, and is relatively inexpensive to manufacture.

Briefly, the above and further objects of the present invention are realized by providing a new and improved DC electrical motor system and method of using it. The DC electrical motor system provides inherent current limiting action to automatically protect against short circuit faults and overloads. It also provides automatic protection of the battery system by reducing the amount of load current as the battery voltage drops. The DC electrical motor system further simplifies the electronic control circuitry for operating the system.

The DC electrical motor system includes a motor having an associated motor rotational speed and an adjustable throttle for selecting a desired motor rotational speed and a maximum motoring speed for the motor. An armature DC transducer coupled electromagnetically to the throttle is responsive to the position thereof to determine the desired motor rotational speed. A field control arrangement is also coupled electromagnetically to the throttle to determine the maximum motoring speed at which the motor develops motoring torque according to the throttle position, wherein an increase of the motor rotational speed above the maximum motoring speed is resisted to help reduce the motor rotational speed to about the desired motor rotational speed.

The DC current transducers enable the magnitude of control currents to be compared to the magnitude of controlled currents as a means of controlling the magnitude of the controlled current in the armature windings conducting the armature electrical current, and in the separately excited electromagnetic field windings conducting the field electrical current.

An exemplary DC transducer of the present invention consists of a ferromagnetic core having an air gap and having two or more electrical windings wound on the core. The windings are wound on the core in such a manner that the control windings develop a magnetic field that is opposed to the magnetic field of the controlled windings in the ferromagnetic core. The direction of the flow of the magnetic flux through the air gap of the ferromagnetic core is determined by the relative ampere-turn strengths of the two opposing magnetic fields.

A bipolar magnetic flux sensor and detector circuit detects the direction of the magnetic flux flow in the air gap of the ferromagnetic core. The bipolar magnetic flux sensor and detector are operatively connected to a semi-conductor or other electrical switching device for causing the semi-conductor device to be either conductive or to be non-conductive.

The semi-conductor device and the bipolar magnetic flux sensor and detector are arranged so that when the ampere-turn magnetic field strength of the control winding is greater than the ampere-turn magnetic field strength of the controlled winding, the direction of magnetic flux flow in the air gap results in the semi-conductor device being conductive. The semi-conductor device thus allows electric current to flow to the controlled winding.

When the ampere-turn strength of the controlled winding is greater than the ampere-turn strength of the control winding, the direction of the magnetic flux flow in the air gap is reversed. As a result, the semi-conductor device becomes non-conductive. When the semi-conductor device is non-conductive, the electric current in the controlled winding decays until the ampere-turn strength of the control winding again becomes stronger than the ampere-turn strength of the controlled winding, resulting in the semi-conductor device becoming conductive again.

The on-off-on action of the semi-conductor device results in the magnetic flux in the air gap being maintained at substantially zero, and the magnitude of the controlled current relative to the magnitude of the control current is maintained at a current ratio determined inversely by a turns ratio of the number of turns of control winding relative to the number of turns of controlled winding.

A throttle-controlled rheostat varies the magnitude of the control current in the control winding of a DC current transducer of a motor armature current controller to select a desired motor rotational speed. The magnitude of the electric current in the motor armature and in the controlled winding is controlled by the bipolar magnetic flux sensor and detector circuit interacting with the main power semi-conductors for the motor.

The exemplary DC current transducer of the motor armature current controller has a turns ratio of 1,000 turns of control winding to one turn of controlled winding. As a result, an electrical current of 0.100 amps of current in the control winding will limit the controlled current to no more than 100 amps as a result of the action of the related magnetic flux sensor and detector, regardless of overload or short-circuit fault conditions in the controlled winding.

Additionally, the exemplary motor system of the present invention includes a DC current transducer acting to control the electric current in the motor field as a function of the throttle position. This DC transducer acts to control the motor field current to be at a maximum at minimum throttle deflection, and to be at a minimum at maximum, or full speed, throttle deflection. Thus, the maximum rotational speed at which the motor can develop motoring torque (the maximum motoring speed) is at a minimum when the throttle deflection is at a minimum, and at a controlled maximum when the throttle is deflected to a maximum throttle position. At rotational speeds above the maximum motoring speed, the motor acts as a generator to develop a retarding torque to attempt to limit or reduce the rotational speed of the motor to about the desired motor rotational speed. The resulting effect of the throttle-position controlled magnitude of field current is to help control the maximum downhill speed of the motor vehicle incorporating the DC electrical motor system of the present invention as a function of the throttle position.

The exemplary motor system of the present invention also includes a DC current transducer with four windings. Three windings are control windings sensing motor armature electric current, and one winding is a controlled winding coupled to the motor field winding. One control winding senses the motor armature current during normal motor operation to control the electric current in a field current control winding to maintain the field current at not less than a fixed ratio over the motor armature current.

The other two control windings sense the presence of motor armature current when the armature terminals are short-circuited through contacts that are closed when a main power contactor is de-energized. One of the two control winding senses one direction of rotation of the motor armature, while the other control winding senses the opposition direction of motor armature rotation. Both of these control windings are initially excited by the motor armature current generated by the residual magnetism of the motor when the motor armature is unintentionally rotating.

One or the other of the two short-circuit current sensing control windings, depending on the direction of rotation of the armature, causes the bipolar magnetic flux sensor and detector circuit to turn the field winding full on to retard the rotation of the motor armature until the motor armature has substantially come to a full stop. As a result, a vehicle with the exemplary motor system of the present invention can only run away unintentionally downhill at a very slow, safe speed.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
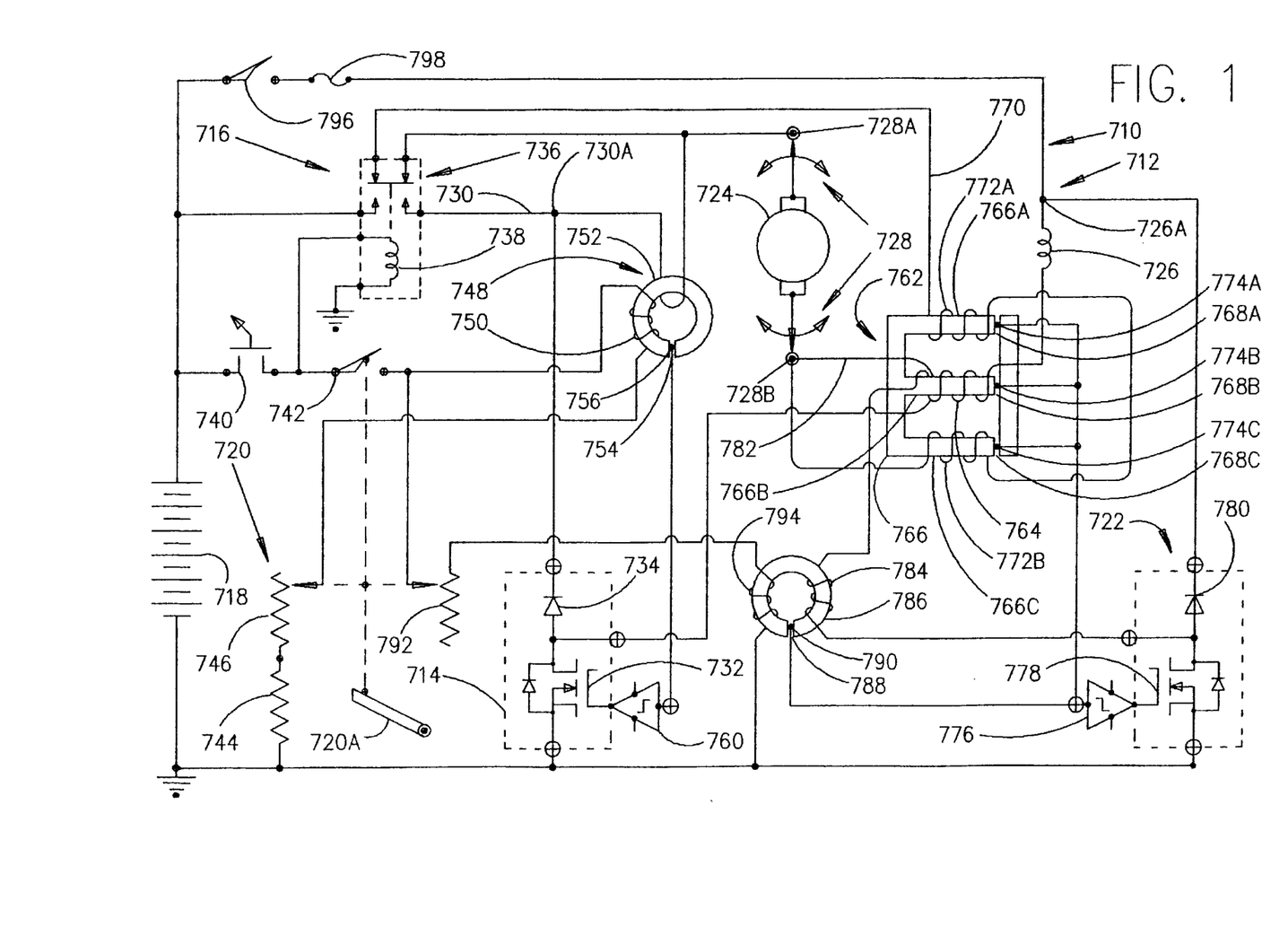
FIG. 1 is a schematic diagram of a direct current electrical motor system which is constructed in accordance with the present invention.

Referring now to FIG. 1, there is shown a DC electric motor system 710 in a non-energized condition, which is constructed according to the present invention. The DC electric motor system 710 is adapted for use with a motor vehicle, including a golf cart, personal mobility cart, or any other motor vehicle utilizing DC electrical energy, to provide fail safe braking abilities.

The motor system 710 generally includes a DC electric motor 712 including a motor armature 724 having armature windings to conduct an armature current, a separately excited motor field winding 726 to conduct a field current, and a battery 718 to supply DC electrical energy to the motor 712. A motor armature current controller 714 is connected to the motor 712 to control the excitation to the motor 712. An activation circuit 716 is connected to the motor 712 to control the supply of electrical energy to the motor 712 through the motor armature current controller 714.

The motor system 710 further includes a throttle circuit 720 having an adjustable throttle 720A, the circuit 720 being connected between the activation circuit 716 and the motor armature current controller 714. The throttle 720A is movable between an elevated, non-depressed position and a depressed position to generate a request for reduced or increased armature current magnitude corresponding to reduced or increased motor rotational speed, and simultaneously generates a request for increased or decreased field current magnitude corresponding to a reduced or increased maximum allowed motoring speed, respectively, to help vary and control the rotational speed of the motor 712 according to the position of the adjustable throttle 720A. In this regard, the field current magnitude is inversely related to the motoring speed. As the field current magnitude increases, the maximum allowed motoring speed decreases. Similarly, as the field current magnitude decreases, the maximum allowed motoring speed increases.

Furthermore, the armature current magnitude, and thus the motor rotational speed, is inversely related to the field current magnitude. An increase in the desired motor rotational speed (i.e., an increase in armature current magnitude) is accompanied by a decrease in field current magnitude, and a decrease in the desired motor rotational speed (i.e., a decrease in armature current magnitude) is accompanied by an increase in field current magnitude. As a result, an increase in the desired motor rotational speed is accompanied by an increase in maximum allowed motoring speed, and a decrease in the desired motor rotational speed is accompanied by a decrease in maximum allowed motoring speed.

The desired motor rotational speed selected by the operator has a corresponding maximum allowed motoring speed associated therewith. Thus, the operator is able to limit or reduce the motor rotational speed to about the desired motor rotational speed by determining the motoring speed according to the selected desired maximum allowed motor rotational speed. The retarding torque developed by the motor tends to resist the increase of the motor rotational speed as it increases above the motoring speed, thereby providing a braking action to attempt to maintain the motor rotational speed at about the desired motor rotational speed.

A throttle position sensor 748 coupled electromagnetically between the throttle circuit 720 and the motor armature 724 is responsive to the request for reduced or increased speed from the throttle 720A to facilitate activating the motor armature current controller 714 for controlling the excitation to the motor 712. The field current is controlled by a field control module 722 coupled to the field winding 726. The field control module 722 is responsive to the request for increased or decreased field current magnitude from the throttle 720A to control the field current, wherein the maximum allowed motoring speed increases as the request for increased motor rotational speed is generated by depressing the throttle 720A, and the maximum allowed motoring speed decreases as the request for decreased motor rotational speed is generated by elevating the throttle 720A.

A forward-reverse switch 728 is connected to the motor armature 724 to permit reversal of the polarity of the motor armature 724. Secondary controlled winding conductor 730 connects the activation circuit 716 to the forward-reverse switch 728 for providing an electrical path therebetween.

The DC electrical motor system 710 facilitates propelling a motor vehicle (not shown) along a ground surface in a safe manner, wherein the motor 712 including the armature 724 and the field winding 726 provides the mechanical energy to propel the motor vehicle. The throttle 720A enables an operator (not shown) of the motor vehicle to select a desired rotational speed of the motor by adjusting the position of the throttle 720A. Generally, the throttle 720A is in the form of a foot pedal that is depressed to increase the motor rotational speed, and released or elevated to decrease the motor rotational speed. However, one skilled in the art will understand that other types of throttles will also operate effectively with the present invention.

In operation, the activation circuit 716 is activated by the operator to enable the motor 712 to be excited. The switch 728 is adjusted according to the desired direction of travel for the motor vehicle. The throttle 720A is depressed to generate a request for increased armature current or increased motor rotational speed. The throttle position sensor 748 responds to the request for increased armature current magnitude to cause the motor armature current controller 714 to increase the armature current magnitude. As the armature current magnitude is increased, the motor rotational speed is increased to propel the motor vehicle in the desired direction.

Depressing the throttle 720A also generates a request for decreased field current magnitude. The field control module 722 responds to the request for decreased field current magnitude by decreasing the magnitude of the field current. By decreasing the magnitude of the field current, the maximum allowed motoring speed is increased. Thus, the operator can simultaneously increase the motor rotational speed and the motoring maximum allowed speed to increase the speed of the motor vehicle along the ground surface by depressing the throttle 720A.

To decrease the speed of the motor vehicle along the ground surface, the operator releases or elevates the throttle 720A. Releasing the throttle 720A generates a request for decreased armature current magnitude and a request for increased field current magnitude. The throttle position sensor 748 responds to the request for decreased armature current magnitude to cause the motor armature current controller 714 to decrease the magnitude of the armature current.

The request for increased field current magnitude causes the field control module 722 to increase the magnitude of the field current, wherein the maximum allowed motoring speed is decreased. As a result, the operator can reduce the maximum allowed motoring speed by elevating or releasing the throttle 720A to help control the speed of the motor vehicle.

In an emergency situation where the motor vehicle is traveling down a steep slope, a braking action can be applied to the motor 712 in a substantially fail safe manner. Simply reducing the magnitude of the armature current is not sufficient to safely control the motor vehicle speed as the motor rotational speed can be increased as the motor vehicle hurtles down the slope. However, by reducing the maximum allowed motoring speed of the motor vehicle in addition to reducing the armature current magnitude, a braking action can be generated by the motor 712 acting as a generator when the motor rotational speed exceeds the motoring speed. Thus, the operator can quickly and easily set the maximum allowed motoring speed of the motor 712 by simply releasing the throttle 720A to help control the speed of the motor vehicle down the slope.

In the preferred embodiment, the throttle 720A enables an infinite number of motoring speeds to be selected between a minimum motoring speed and a maximum motoring speed. It will be understood by one skilled in the art that a discrete number of motoring speeds could be selected with the throttle 720A and still control the speed of the motor vehicle as contemplated herein.

Considering now the activation circuit 716 in greater detail, the activation circuit 716 includes a main power contactor 736 connected between the battery 718 and the forward-reverse switch 728 to complete an electrical circuit from the battery 718 through the motor armature 724 to the motor armature current controller 714 when a coil 738 is energized. The coil 738 is connected in series with an on-off key switch 740, wherein coil 738 is energized by the battery 718 when the key switch 740 is closed. In the de-energized condition, the main power contactor 736 connects node 728A to node 728B through a conductor 770 and primary control windings 772A and 772B of an armature-field current comparator 762 which will be described hereinafter in greater detail.

Considering now the throttle position sensor 748 in greater detail, the throttle position sensor 748 includes a primary control winding 750 wrapped around a DC transducer, such as ferromagnetic core 752 having an air gap 754. The ferromagnetic core 752 surrounds a secondary controlled winding conductor 730 and reacts electromagnetically therewith. An end of the primary control winding 750 is connected to a throttle position switch 742 while the other end is connected to a throttle position rheostat 746. A throttle-limit resistor 744 is connected between the throttle position rheostat 746 and the battery 718.

The throttle position sensor 748 further includes a Hall effect magnetic flux sensor 756 connected to a magnetic flux-crossing detector 760, wherein the Hall effect magnetic flux sensor 756 is disposed within the air gap 754 to detect the direction of the magnetic flux crossing the air gap 754. The magnetic flux-crossing detector 760 is connected to the motor armature current controller 714 to control the magnitude of the armature current in the secondary controlled winding conductor 730.

Considering now the motor armature current controller 714 in greater detail, the motor armature current controller 714 is connected between the armature 724 and the battery 718. The motor armature current controller 714 includes a field-effect transistor 732 responsive to the detector 760 to control the flow of electric armature current through the motor armature 724. The transistor 737 is controlled by the detector 760 to be either non-conductive or conductive, depending upon the direction of the magnetic flux crossing the air gap 754. A free-wheeling diode 734 connected between the transistor 732 and node 730A helps to smooth the electric current pulses in the motor armature 724, and also provides a path for a short-circuit electric current of the motor armature 724 generated when the forward-reverse switch 728 is actuated to reverse the direction of electric current flow through the motor armature 724 while the motor armature 724 is still rotating.

Considering now the field control module 722 in greater detail, the field control module 722 includes a field-effect transistor 778 to control the flow of electric field current through the motor field winding 726. A free-wheeling diode 780 connected between the field-effect transistor 778 and a node 726A helps smooth the electric current pulses in the motor field winding 726.

The field control module 722 further includes a DC transducer, such as ferromagnetic core 786 having an air gap 788, and a field control rheostat 792 connected to a primary control winding 794 wrapped around the ferromagnetic core 786. A secondary controlled winding 784 connected to the motor field winding 726 is wrapped around the core 786 for electromagnetically coupling the primary control winding 794 to the secondary controlled winding 784.

A Hall effect magnetic flux sensor 790 connected to a magnetic flux-crossing detector 776 is disposed within the air gap 788 to detect the magnitude and direction of the magnetic flux crossing the air gap 788. The detector 776 is connected to the field-effect transistor 778 to control the magnitude of the field current. The transistor 778 is controlled by the detector 776 to be either non-conductive or conductive.

The field control module 722 further includes another DC transducer in the form of armature-field current comparator 762 including an E-I ferromagnetic core 766 having legs 766A, 766B, and 766C, and corresponding air gaps 768A, 768B, and 768C. A secondary controlled winding 764 wrapped around the center leg 766B of the core 766 cooperates electromagnetically with a primary control winding conductor 782 connected to the armature 724 for conducting armature current.

A Hall effect magnetic flux sensor 774B is connected to the magnetic flux-crossing detector 776, wherein the Hall effect magnetic flux sensor 774B is disposed within the air gap 768B to detect the magnitude and direction of the magnetic flux crossing the air gap 768B.

A pair of primary control windings 772A and 772B are wrapped around outer legs 766A and 766C, respectively, of the core 766 for detecting short circuit conditions of the armature 724. Hall effect magnetic flux sensors 774A and 774C are also connected to the magnetic flux-crossing detector 776, wherein the Hall effect magnetic flux sensors 774A and 774C are disposed within the air gaps 768A and 768C to detect the magnitude and direction of the magnetic flux crossing the air gaps 768A and 768C.

In operation, the field switch 796 is closed to complete the electric circuit from the battery 718 to the motor field winding 726 and the field control module 722. The key switch 740 is closed to complete the electric circuit from the battery 718 to the coil 738 to close the main power contactor 736. Closure of the main power contactor 736 electrically connects the battery 718, the secondary controlled winding conductor 730, the motor armature 724, the primary control winding conductor 782, and the field-effect transistor 732 to energize the motor 712.

The initial depressing movement of the throttle 720A closes the throttle position switch 742 to electrically connect the battery 718, the primary control winding 750, and the throttle position rheostat 746. The throttle 720A controls the throttle position rheostat 746 to vary the magnitude of the electric current in the primary control winding 750 of the throttle position sensor 748.

The primary control winding 750 is arranged on the ferromagnetic core 752 to establish a magnetic field in the ferromagnetic core 752 by the flow of electric current through the primary control winding 750 in the opposite direction from the magnetic field established in the ferromagnetic core 752 by the flow of electric current through the secondary controlled winding conductor 730.

The Hall effect magnetic flux sensor 756 senses the direction of the flow of magnetic flux in the air gap 754. The direction of the flow of the magnetic flux in the air gap 754 is determined by the relative magnitude of the ampere-turn strength of the magnetic field established in the ferromagnetic core 752 by the flow of electric current in the primary control winding 750 compared to the ampere-turn strength of the magnetic field established in the ferromagnetic core 752 by the flow of electric current in the secondary controlled winding conductor 730.

The magnetic flux-crossing detector 760 is responsive to the sensor 756 for controlling the field-effect transistor 732 to be non-conductive for one direction of the flow of magnetic flux in the air gap 754, and to be conductive for the opposite direction of the flow of the magnetic flux. Furthermore, the magnetic flux-crossing detector 760 enables the field-effect transistor 732 to be conductive when the ampere-turn strength of the magnetic field established in the ferromagnetic core 752 by the primary control winding 750 is greater than the ampere-turn strength of the magnetic field established in the ferromagnetic core 752 by the secondary controlled winding conductor 730, and to be non-conductive when the opposite is true.

As a result, the field-effect transistor 732 is turned on and off, and back on again, in a repeated cycle as the flow of magnetic flux through the gap 756 reverses each time the field-effect transistor 732 is turned on or off to control the magnitude of the armature current. The free-wheeling diode 734 smoothes the pulses of electric current in the circuit containing the secondary controlled winding conductor 730 and the armature 724.

The on-off-on cycle of the field-effect transistor 732 enables the flow of magnetic flux in the air gap 754 to be maintained substantially near zero. In addition, the ampere-turn magnetic field strength established in the ferromagnetic core 752 by the secondary controlled winding conductor 730 is modulated to be substantially equal to the ampere-turn magnetic strength established in the ferromagnetic core 752 by the primary control winding 750.

When the ampere-turn magnetic field strength established in the ferromagnetic core 752 by the secondary controlled winding conductor 730 is maintained substantially equal to the ampere-turn magnetic field strength established in the ferromagnetic core 752 by the primary control winding 750, the current ratio of the armature current magnitude relative to the magnitude of the electric current in the primary control winding 750 is determined by a turns ratio of the number of turns of the secondary controlled winding conductor 730, which is effectively one turn, relative to the number of turns in the primary control winding 750.

An exemplary throttle position sensor 748 has a primary control winding with 1000 turns so that the magnitude of the electric current in the secondary controlled winding conductor 730 will be modulated by the field-effect transistor 732 to be substantially equal to 1000 times the magnitude of the electric current in the primary control winding.

The throttle 720A of the exemplary motor system 710 controls the throttle position rheostat 746 to vary the electric current in the primary control winding 750 between about zero amps of electric current to about 0.25 amps of electric current. As a result, the electric current in the secondary controlled winding conductor 730 is varied from about zero amps of electric current to about 250 amps of electric current.

The throttle 720A further cooperates with the field control rheostat 792 to vary the magnitude of the electric current in the primary control winding 794. In this regard, the flow of electric current from the field control rheostat 792 through the primary control winding 794 to the battery 718 establishes a magnetic field in the ferromagnetic core 786 in the opposite direction from the magnetic field established in the ferromagnetic core 786 by the flow of electric current from the motor field winding 726 through the secondary controlled winding 784 to the field-effect transistor 778.

The Hall effect magnetic flux sensor 790 senses the direction of the flow of magnetic flux in the air gap 788. The direction of the flow of the magnetic flux in the air gap 788 is determined by the relative magnitude of the ampere-turn strength of the magnetic field established in the ferromagnetic core 786 by the flow of electric current in the primary control winding 794 compared to the ampere-turn strength of the magnetic field established in the ferromagnetic core 786 by the flow of electric current from the motor field winding 726 through the secondary controlled winding 784 to the field-effect transistor 778.

The magnetic flux-crossing detector 776 is operatively connected to the field-effect transistor 778, the transistor 778 being adapted to be non-conductive for one direction of the flow of magnetic flux in the air gap 788, and to be conductive for the opposite direction of the flow of the magnetic flux. The magnetic flux-crossing detector 776 further enables the transistor 778 to be conductive when the ampere-turn strength of the magnetic field established in the ferromagnetic core 786 by the flow of electric current in the primary control winding 794 is greater than the ampere-turn strength of the magnetic field established in the ferromagnetic core 786 by the flow of electric current through the secondary controlled winding 784, and to be non-conductive when the opposite is true.

As a result, the field-effect transistor 778 is turned on and off, and back on again, in a repeated cycle as the flow of magnetic flux reverses each time the field-effect transistor 778 is turned on or off. The free-wheeling diode 780 smoothes the pulses of the electric current in the circuit containing the motor field winding 726 and the secondary controlled winding 784.

Due to the on-off-on cycle of the field-effect transistor 778, the flow of magnetic flux in the air gap 788 is maintained substantially near zero, and the ampere-turn magnetic field strength established in the ferromagnetic core 786 by the flow of electric current in the secondary controlled winding 784 is modulated to be substantially equal to the ampere-turn magnetic strength established in the ferromagnetic core 786 by the flow of electric current in the primary control winding 794.

When the ampere-turn magnetic field strength established in the ferromagnetic core 786 by the flow of electric current in the secondary controlled winding 784 is modulated to be substantially equal to the ampere-turn magnetic strength established in the ferromagnetic core 786 by the flow of electric current in the primary control winding 794, the current ratio of the field current magnitude relative to the magnitude turns of the electric current in the primary control winding 794 is determined by a turns ratio of the number of turns of the secondary controlled winding 784 relative to the number of turns in the primary control winding 794.

An exemplary primary control winding 794 has a turns ratio of 200 to 1 with respect to the turns in the secondary controlled winding 784. The field control rheostat 792 varies the electric current in the primary control winding from about 0.075 amps of current to about 0.022 amps of current as the throttle 720A is depressed to the full speed position. In turn, the field electric current in the field winding 726 is controllably varied from about 15 amps of current to about 4.4 amps of current at the full-speed throttle position.

The magnitude of the motor field current in the motor field winding 726, for each position of the throttle 720A, inversely determines the maximum rotational speed at which the motor armature 724 can develop positive motor torque (the motoring speed). In this regard, as the magnitude of the field current increases, the maximum allowed motoring speed decreases. Similarly, a decrease in the field current magnitude results in an increase in the maximum allowed motoring speed.

The minimum rotational speed of the armature 724 occurs at the maximum allowed motor field winding current (throttle barely depressed), and the maximum allowed rotational speed of the armature 724 occurs at the minimum motor field winding current (throttle 720A fully depressed). As a result, the vehicle operator can merely release the throttle 720A in an emergency situation, allowing the throttle 720A to return to a substantially non-depressed position, in order to minimize the maximum allowed motoring speed quickly and easily. Consequently, any increase in motor rotational speed above the minimized motoring speed produces a retarding torque that tends to resist the increase in motor rotational speed, wherein the motor rotational speed is restrained in a failed safe manner.

Considering now the operation of the armature-field current comparator 762, the secondary controlled winding 764 establishes a magnetic field in the center leg 766B of the E-I ferromagnetic core 766 in the opposite direction from the magnetic field established in the center leg 766B by the flow of armature current through the primary control winding conductor 782.

The Hall effect magnetic flux sensor 774B senses the direction of the flow of magnetic flux in the air gap 768B to enable the magnetic flux-crossing detector 776 to control the field-effect transistor 778. The Hall effect magnetic flux sensor 774B, the magnetic flux-crossing detector 776 and the field-effect transistor 778 modulate the electric current in the secondary controlled winding 764 to help maintain the flow of magnetic flux in the air gap 774B at substantially near zero, in substantially the same manner as previously described for the interaction of Hall effect magnetic flux sensor 790, magnetic flux-crossing detector 776 and field-effect transistor 778.

The current ratio of the field winding current magnitude through the secondary controlled winding 764 to the armature current magnitude through the primary control winding conductor 782 is determined by the turns ratio of the number of turns of the secondary controlled winding 764 to the number of turns of the primary control winding conductor 782.

In the exemplary motor system 710 of the present invention, the turns ratio of the number of turns of the secondary controlled winding 764 relative to the number of turns of the primary control winding conductor 782 is about 15 to 1. Consequently, the field-effect transistor 778 is turned on and off and on again to maintain the field winding current magnitude to be not less than ¹⁄₁₅ of the armature current magnitude in the primary control winding conductor 782.

Considering now the operation of the motor system 710 when the key switch 740 is turned off, the main power contactor 736 is de-energized to open the circuit for the flow of electric current from the battery 718 to the conductor 730, and the electric circuit from node 728A to 728B is closed to short-circuit the motor armature 724.

The primary control winding 772A of the field control module 722 is responsive to residual magnetism in the motor 712 to establish a direction of magnetic flux flow in air gap 768A. The flux flow enables the Hall effect magnetic flux sensor 774A and magnetic flux-crossing detector 776 to cause the field-effect transistor 778 to be conductive, and stay conductive, as long as electric current flows from conductor 770 through primary control winding 772A to node 728B.

Similarly, the primary control winding 772B of the field control module 722 is responsive to the residual magnetism in the motor 712 to establish a direction of magnetic flux flow in air gap 768C. The flux flow enables the Hall effect magnetic flux sensor 774C and magnetic flux-crossing detector 776 to cause the field-effect transistor 778 to be conductive, and stay conductive, as long as electric current flows from node 728B through armature short-circuit winding 772C to conductor 770.

The residual magnetism in the de-energized motor 712 is sufficient to cause the flow of electricity in either direction through the circuitry of the short-circuited motor armature 724 and primary control windings 772A and 772B to activate field-effect transistor 778 whenever the armature 724 rotates in either direction of rotation at rotational speeds above about 5% of the rated armature rotational speed. Activation of the field-effect transistor 778 turns the motor field current full on to cause the motor armature 724 to develop a maximum retarding torque opposing the rotation of the motor armature 724.

The field-effect transistor 778 turns off when the motor armature 724 stops rotating to generate the flow of electric current in the short-circuited circuitry containing primary control windings 772A and 772B.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A direct current electrical motor system, the motor having a desired motoring rotational speed and a desired maximum motor rotational speed, comprising:

transducer means for facilitating a comparison between a control current and a controlled current;

control winding means for generating a control magnetic field in said transducer means having a control strength corresponding to said control current;

request means coupled to said control winding means for adjusting said control current;

controlled winding means for generating a controlled magnetic field in said transducer means having a controlled strength corresponding to said controlled current;

detection means for sensing said control magnetic field and said controlled magnetic field to generate an activate signal when said control strength is greater than said controlled strength;

current controller means responsive to said activate signal for adjusting said controlled current until said controlled strength is substantially the same as said control strength;

said request means for causing the desired motoring rotational speed and the desired maximum motor rotational speed to be adjusted continuously and simultaneously; and wherein responsive to said request means said controlled current is adjusted so that the motor functions as a generator to develop a retarding torque when the motor's rotational speed increases above the desired maximum motor rotational speed.

2. A direct current electrical motor system according to claim 1, wherein said transducer means includes a ferromagnetic core having a gap.

3. A direct current electrical motor system according to claim 1, wherein said current controller is an armature current controller and said controlled current is an armature current.

4. A direct current electrical motor system according to claim 3, wherein said control winding means and said controlled winding means are related by a turns ratio of about 1,000 to 1.

5. A direct current electrical motor system according to claim 1, wherein said current controller is a field current controller and said controlled current is a field current.

6. A direct current electrical motor system according to claim 5, wherein said control winding means and said controlled winding means are related by a turns ratio of about 200 to 1.

7. A direct current electrical motor system including a motor having an associated motor rotational speed, an armature winding to conduct an armature current and a field winding to conduct a field current, comprising:

request means for generating an armature current magnitude request to help determine a desired rotational speed for the motor, and for generating a field current magnitude request to help determine a motoring speed indicative of a maximum motor rotational speed at which the motor develops motoring torque corresponding to said desired rotational speed;

sensor means for electromagnetically coupling said request means to the armature to enable the armature current magnitude to be controlled in response to said armature current magnitude request for determining said desired rotational speed;

field control means coupled electromagnetically to said request means for controlling the field current magnitude in response to said field current magnitude request for determining said motoring speed corresponding to said desired rotational speed; and wherein said desired rotational speed and said motoring speed increase and decrease together to enable the motor to function as a generator to develop a retarding torque when the motor rotational speed of the motor increases above said motoring speed for resisting the increase of the motor rotational speed above said motoring speed to help reduce the motor rotational speed to about said desired rotational speed.

8. A direct current electrical motor system according to claim 7, wherein said request means includes an adjustable throttle and a throttle position rheostat responsive to the position of said throttle for generating said armature current magnitude request.

9. A direct current electrical motor system according to claim 8, wherein said field control means further includes a field control rheostat responsive to said throttle position for generating said field current magnitude request.

10. A direct current electrical motor system according to claim 9, wherein said armature current magnitude request and said field current magnitude request are generated simultaneously.

11. A direct current electrical motor system according to claim 7, further including:

an armature controller means connected to the armature and responsive to said sensor means for controlling the excitation of the motor; and said sensor means including an armature transducer means responsive to said armature current magnitude request and said armature current magnitude for activating said armature controller means.

12. A direct current electrical motor system according to claim 11, wherein said armature transducer means includes an armature ferromagnetic core, an armature primary winding having a given number of primary turns disposed about said core for producing a primary magnetic flux therein, and an armature secondary winding having a given number of secondary turns disposed about said core for producing a primary magnetic flux therein, said given number of primary turns and said given number of secondary turns being determined by a turns ratio of primary turns to secondary turns.

13. A direct current electrical motor system according to claim 12, wherein said turns ratio of primary turns to secondary turns is about 1000 to 1.

14. A direct current electrical motor system according to claim 12, wherein said sensor means further includes flux sensor means for detecting the direction of flow of said primary magnetic flux and said secondary magnetic flux, and detector means coupled to said flux sensor means for activating said armature controller means.

15. A direct current electrical motor system including a motor having an associated motor rotational speed, an armature winding to conduct an armature current and a field winding to conduct a field current, comprising;

request means for generating an armature current magnitude request to help determine a desired rotational speed for the motor, and for generating a field current magnitude request to help determine a motoring speed indicative of a maximum motor rotational speed at which the motor develops motoring torque corresponding to said desired rotational speed;

sensor means for electromagnetically coupling said request means to the armature to enable the armature current magnitude to be controlled in response to said armature current magnitude request for determining said desired rotational speed;

field control means coupled electromagnetically to said request means for controlling the field current magnitude in response to said field current magnitude request for determining said motoring speed corresponding to said desired rotational speed;

wherein said desired rotational speed and said motoring speed increase and decrease together to enable the motor to fiction as a generator to develop a retarding torque when the motor rotational speed of the motor increases above said motoring speed for resisting the increase of the motor rotational speed above said motoring speed to help reduce the motor rotational speed to about said desired rotational speed; and wherein said field control means includes a field controller means connected to the field winding for adjusting the field current magnitude, and field transducer means coupled electromagnetically between said request means and the field winding for and responsive to said field current magnitude request for activating said field controller means.

16. A direct current electrical motor system according to claim 15, wherein said field transducer means includes a field ferromagnetic core, a field primary winding having a given number of field primary turns disposed about said core for producing a primary magnetic flux therein, and a field secondary winding having a given number of field secondary turns disposed about said core for producing a secondary magnetic flux therein, said given number of primary turns and said given number of secondary turns being determined by a turns ratio of field primary turns to field secondary turns.

17. A direct current electrical motor system according to claim 16, wherein said turns ratio of primary turns to secondary turns is about 200 to 1.

18. A direct current electrical motor system according to claim 16, wherein said field control means further includes flux sensor means for detecting the direction of flow of said primary magnetic flux and said secondary magnetic flux, and detector means coupled to said flux sensor means for activating said field controller means.

19. A direct current electrical motor system including a motor having an associated motor rotational speed, an armature winding to conduct an armature current and a field winding to conduct a field current, comprising;

request means for generating an armature current magnitude request to help determine a desired rotational speed for the motor, and for generating a field current magnitude request to help determine a motoring speed indicative of a maximum motor rotational speed at which the motor develops motoring torque corresponding to said desired rotational speed;

sensor means for electromagnetically coupling said request means to the armature to enable the armature current magnitude to be controlled in response to said armature current magnitude request for determining said desired rotational speed;

field control means coupled electromagnetically to said request means for controlling the field current magnitude in response to said field current magnitude request for determining said motoring speed corresponding to said desired rotational speed;

wherein said desired rotational speed and said motoring speed increase and decrease together to enable the motor to function as a generator to develop a retarding torque when the motor rotational seed of the motor increases above said motoring speed for resisting the increase of the motor rotational speed above said motoring speed to help reduce the motor rotational speed to about said desired rotational speed;

wherein said field control means further includes a field controller means connected to the field winding for adjusting the field current magnitude, and an armature-field comparator means coupled electromagnetically between the armature winding and the field winding for activating said field controller means to help maintain a relationship of the field current magnitude relative to the armature current magnitude at about a given ratio; and wherein said armature-field comparator means includes short circuit transducer means connected to said field controller means for sensing an armature short circuit current generated by residual magnetism in the armature, wherein said field controller means increases said field current magnitude when said short circuit transducer means senses said armature short circuit current.

20. A direct current electrical motor system according to claim 19, wherein said armature-field comparator means includes an E-I ferromagnetic core.

21. A method of using a direct current electrical motor system including a motor having an associated motor rotational speed, an armature to conduct an armature current and a field winding to conduct a field current, comprising:

generating an armature current magnitude request to help determine a desired rotational speed for the motor;

generating a field current magnitude request to help determine a motoring speed indicative of a maximum motor rotational speed at which the motor develops motoring torque corresponding to said desired rotational speed;

controlling the armature current magnitude in response to said armature current magnitude request for determining said desired rotational speed;

controlling the field current magnitude in response to said field current magnitude request for determining said motoring speed corresponding to said desired rotational speed;

increasing and decreasing said desired rotational speed and said motoring speed together; and developing a retarding torque when the motor rotational speed of the motor increases above said motoring speed for resisting the increase of the motor rotational speed above said motoring speed to help reduce the motor rotational speed to about said desired rotational speed.

22. A method according to claim 21, further including repositioning a throttle to adjust said desired rotational speed and said motoring speed.

23. A method according to claim 22, further including:

detecting an armature short circuit current; and adjusting the field current magnitude to restrain rotation of the armature in response to the detection of said armature short circuit current.

24. A direct current electric motor system including armature winding means for conducting an armature current; and electromagnetic field winding means for conducting a field current, the motor having a desired motoring rotational speed and a desired maximum motor rotational speed, comprising:

control module means electrically coupled to said armature winding means for varying the magnitude of said armature winding current and electrically coupled to said field winding means for varying the magnitude of said field current controlled winding means coupled to said armature winding means for conducting said armature current said armature current urging the motor to rotate at the desired motoring speed;

control winding means for conducting a control current;

comparison means for comparing the ampere-turn strength of said controlled winding means with the ampere-turn strength of said control winding means, wherein said comparison means are connected to said control module means to vary said magnitude of said armature winding current to maintain the ampere-turn strength of said controlled winding means substantially equal to the ampere-turn strength of said control winding means; and the desired motoring rotational speed and the desired maximum motor rotational speed are adjusted together continuously and simultaneously.

25. A system according to claim 24, wherein said control and said controlled winding means include ferromagnetic cores and windings thereon.

26. A system according to claim 24, further including a throttle, and throttle means for causing an increase in control current as said throttle is actuated.

27. A system according to claim 24, wherein the ratio of said controlled current to said control current is substantially the same as the ratio of the number of turns in said control winding means to the number of turns in said controlled winding means when the two ampere-turn strengths are maintained substantially equal to one another.

28. A direct current electric motor system including armature winding means for conducting an armature current; and electromagnetic field winding means for conducting a field winding current; comprising:

control module means electrically coupled to said field winding means for varying the magnitude of said field winding current;

controlled winding means coupled to said field winding means for conducting said field current.

control winding means for conducting a control current; and comparison means for comparing the ampere-turn strength of said controlled winding means with the ampere-turn strength of said control winding means, wherein said comparison means are connected to said control module means to vary said magnitude of said field winding current to maintain the ampere-turn strength of said controlled winding means substantially equal to the ampere-turn strength of said control winding means.

29. A system according to claim 28, further including a throttle, and throttle means for causing a decrease in control current as said throttle is actuated.

30. A system according to claim 28, wherein said controlled and said control winding means include ferromagnetic cores and windings thereon.

31. A system according to claim 28, wherein the ratio of said controlled current to said control current is substantially the same as the number of turns in said control winding means to the number of turns in said controlled winding means when the two ampere-turn strengths are maintained substantially equal to one another.

32. A direct current electric motor system including motor armature means containing armature winding means for conducting an armature current; and motor field means containing electromagnetic field winding means for conducting a field winding current, comprising:

control module means electrically coupled to said field winding means for varying the magnitude of said field winding current;

controlled winding means coupled to said field winding means for conducting said field current;

a first control winding means for conducting a first control current;

a second control winding means for conducting a second control current;

switch means for short-circuiting said armature winding means through said first control winding means and through said second control winding means;

first comparison means for comparing the ampere-turn strength of said controlled winding means with the ampere-turn strength of said first control winding means for a first direction of rotation of said motor armature means, wherein said first comparison means are connected to said control module means to vary said magnitude of said field winding current to maintain the ampere-turn strength of said controlled winding means substantially equal to the ampere-turn strength of said first control winding means;

second comparison means for comparing the ampere-turn strength of said controlled winding means with the ampere-turn strength of said second control winding for a second direction of rotation of said motor armature means, wherein said second comparison means are connected to said control module means to vary said magnitude of said field winding current to maintain the ampere-turn strength of said controlled winding means substantially equal to the ampere-turn strength of said second control winding means.

33. A direct current electrical motor system including a motor having an associated motor rotational speed, an armature to conduct an armature current and a field winding to conduct a field current, comprising:

means for generating an armature current magnitude request to help determine a desired rotational speed for the motor;

means for generating a field current magnitude request to help determine a motoring speed indicative of a maximum motor rotational speed at which the motor develops motoring torque corresponding to said desired rotational speed;

means for controlling the armature current magnitude in response to said armature current magnitude request for determining said desired rotational speed;

means for controlling the field current magnitude in response to said field current magnitude request for determining said motoring speed corresponding to said desired rotational speed;

means for increasing and decreasing said desired rotational speed and said motoring speed together; and means for developing a retarding torque when the motor rotational speed of the motor increases above said motoring speed for resisting the increase of the motor rotational speed above said motoring speed to help reduce the motor rotational speed to about said desired rotational speed.

34. A system according to claim 33, further including means for repositioning a throttle to adjust said desired rotational speed and said motoring speed.

35. A system according to claim 34, further including:

means for detecting an armature short circuit current; and means for adjusting the field current magnitude to restrain rotation of the armature in response to the detection of said armature short circuit current.

36. A method of using a direct current electrical motor system including a motor having an associated motor rotational speed, an armature and a field winding, comprising:

generating an armature request to help determine a desired rotational speed for the motor;

generating a field request to help determine a motoring speed indicative of a maximum motor rotational speed at which the motor develops motoring torque corresponding to said desired rotational speed;

controlling in response to said armature request said desired rotational speed;

controlling in response to said field request said motoring speed corresponding to said desired rotational speed;

increasing and decreasing said desired rotational speed and said motoring speed together; and developing a retarding torque when the motor rotational speed of the motor increases above said motoring speed for resisting the increase of the motor rotational speed above said motoring speed to help reduce the motor rotational speed to about said desired rotational speed.

37. A method according to claim 36, further including repositioning a throttle to adjust said desired rotational speed and said motoring speed.

38. A method according to claim 36, further including:

detecting an armature short circuit current; and adjusting the field windings to restrain rotation of the armature in response to the detection of said armature short circuit current.

39. A system of using a direct current electrical motor system including a motor having an associated motor rotational speed, an armature and a field winding, comprising:

means for generating an armature request to help determine a desired rotational speed for the motor;

means for generating a field request to help determine a motoring speed indicative of a maximum motor rotational speed at which the motor develops motoring torque corresponding to said desired rotational speed;

means for controlling in response to said armature request said desired rotational speed;

means for controlling in response to said field request said motoring speed corresponding to said desired rotational speed;

means for increasing and decreasing said desired rotational speed and said motoring speed together; and means for developing a retarding torque when the motor rotational speed of the motor increases above said motoring speed for resisting the increase of the motor rotational speed above said motoring speed to help reduce the motor rotational speed to about said desired rotational speed.

40. A system according to claim 39, further including means for repositioning a throttle to adjust said desired rotational speed and said motoring speed.

41. A system according to claim 39, further including:

means for detecting an armature short circuit current; and means for adjusting the field windings to restrain rotation of the armature in response to the detection of said armature short circuit current.

* * * * *

UNITED STATES PATENT AND TRADEMARK OFFICE
CERTIFICATE OF CORRECTION

PATENT NO   : 5,929,582
DATED       : July 27, 1999
INVENTOR(S) : William M. Halliday It is certified that error appears in the above-identified patent and that said Letters Patent are hereby corrected as shown below:

Column 14, Line 52 "fiction" should be "function"

Column 15, Line 21 The semicolon should be a colon

Signed and Sealed this

Eighth Day of February, 2000

Attest:

Q. TODD DICKINSON

Attesting Officer

Commissioner of Patents and Trademarks